United States Patent [19]

Lindon et al.

[11] 4,325,975

[45] Apr. 20, 1982

[54] MINERALIZED DRINKING WATER AND METHOD OF MAKING SAME

[76] Inventors: John A. Lindon, 255 S. Beverly Glen Blvd., Los Angeles, Calif. 90024; Arthur Malin, 606 N. Foothill Rd., Beverly Hills, Calif. 90210

[21] Appl. No.: 218,472

[22] Filed: Dec. 22, 1980

Related U.S. Application Data

[63] Continuation-in-part of Ser. No. 108,538, Dec. 31, 1979, abandoned.

[51] Int. Cl.$^3$ ............................................. A23L 2/00
[52] U.S. Cl. ................................... 426/66; 210/749; 426/74; 424/127
[58] Field of Search ............... 210/749; 424/127, 153; 426/66, 67, 74, 590, 330, 330.3; 423/580

[56] References Cited

U.S. PATENT DOCUMENTS

| | | | |
|---|---|---|---|
| 580,322 | 4/1897 | Anderson | 424/127 |
| 1,021,087 | 3/1912 | Bienz | 426/66 |
| 3,215,626 | 11/1965 | Console | 210/749 |

FOREIGN PATENT DOCUMENTS

| | | | |
|---|---|---|---|
| 1457968 | 12/1976 | United Kingdom | 424/127 |

OTHER PUBLICATIONS

Fairbridge, R. W.; "The Encyclopedia of Geochemistry and Environmental Sciences"; vol. IV; pp. 699-704 (1972).

Rubin, A. J.; "Chemistry of Water Supply Treatment and Distribution"; pp. 423-440 (1974).

*Primary Examiner*—Benoit Castel
*Attorney, Agent, or Firm*—I. Morley Drucker

[57] ABSTRACT

This invention is directed to an optimal mineralized potable or drinking water formulation. The optimal mineralized drinking i.e., potable, water formulation strongly appears to have great utility in preventing cardiovascular disease and is an aqueous solution consisting essentially of:

- 20-40 mg/liter Strontium ions;
- 50-100 mg/liter Magnesium ions;
- 60-125 mg/liter Calcium ions; and
- 0.06-0.15 mg/liter Lithium.

All the chemical elements are present in the ionic form as water soluble salts, e.g., as sulfates, nitrates, or chlorides of the elements. The mineral water contains no sodium or potassium ions.

10 Claims, No Drawings

MINERALIZED DRINKING WATER AND METHOD OF MAKING SAME

This application is a continuation-in-part of application Ser. No. 108,538, entitled "MINERALIZED DRINKING WATER AND METHOD OF MAKING SAME" and filed on Dec. 31, 1979, John A. Lindon and Arthur Malin, co-inventors, now abandoned.

BACKGROUND OF THE INVENTION

There is much epidemiological evidence found in the literature indicating that the drinking of naturally occurring mineralized waters of one type or another have the effect of decreasing mortality due to cardiovascular disease. Examples of the most relevant literature of which we are presently aware attesting to such epidemiological evidence are the following publications:

(1) "MAGNESIUM AND THE HEART", American Heart Journal, June, 1977, Vol. 93, No. 6, pp. 679, 682, B & J. R. Chipperfield;

(2) "RELATIONSHIP OF METAL METABOLISM TO VASCULAR DISEASE MORTALITY RATES IN TEXAS", The American Journal of Clinical Nutrition, 31; July 1978, pp. 1188-1197, E. B. Dawson et al.;

(3) "WATER HARDNESS AND CARDIOVASCULAR MORTALITY" Annals New York Academy of Sciences, 0077-8923/78/0304-0203 pp. 203-219, Neri and Johansen; 1978;

(4) "MINERALS, CORONARY HEART DISEASE AND SUDDEN CORONARY DEATH", Adv. Cardiol., Vol. 25, pp. 9-24, H. Karppanen et al.; 1978;

(5) "DRINKING WATER QUALITY AND SUDDEN DEATH", Adv. Cardiol. Vol. 25, pp. 25-26, 1978 S. Punsar et al.

However, neither the naturally occurring drinking waters of which we are aware nor any manufactured waters provide a formulation for mineralized drinking water which, in our opinion, is an optimum formulation in terms of maximizing the decrease in both the incidence of cardiovascular disease and the mortality rate due to cardiovascular disease.

BRIEF SUMMARY OF THE INVENTION

The optimal mineralized drinking, i.e., potable water formulation strongly appears to have great utility in preventing cardiovascular diseases and is an aqueous solution consisting essentially of:
20-40 mg/liter Strontium ions;
50-100 mg/liter Magnesium ions;
60-125 mg/liter Calcium ions; and
0.06-0.15 mg/liter Lithium ions.

All the chemical elements are present in the ionic form—as water soluble salts, e.g., as sulfates, nitrates, or chlorides of the elements. The mineral water contains no sodium or potassium ions.

This precise combination of ingredients, and the concentration thereof, are believed to be most beneficial in preventing various cardiovascular diseases especially hypertensive heart disease, hypertension, arteriosclerotic and degenerative heart disease, and generalized arteriosclerosis.

Each of the ionic forms of the elements appear to contribute to the prevention of cardiovascular disease in various ways. Thus, the introduction of lithium salts into the mineralized formulation acts as a natural diuretic removing excess or harmful levels of sodium, potassium and water, thereby reducing the incidence of hypertension and other cardiovascular conditions that may be induced by the presence of excessive sodium salts. Acting in concert with the lithium salts are the water-soluble magnesium salts, which are very important as an activator of many enzymes, particularly those essential for maintaining healthy myocardial tissues and healthy myocardial functioning. Magnesium salts are found to aid in preventing "sudden death" after myocardial infarction possibly by reducing the incidence and degree of cardiac arrythmias following infarction. Calcium and strontium salts, too, have been found to reduce cardiovascular disease, possibly by competing with sodium and potassium for intestinal absorption and by increasing excretion of sodium.

While the literature is voluminous on the advantages (of reduced cardiovascular disease) fortuitously accruing to those who happen to live in areas of the world which have naturally occurring highly mineralized waters, none of the prior art references, of which we are aware, attempt to produce a mineralized potable water which has a zero sodium level, together with a combination of metals (in the form of water-soluble salts thereof) having known positive effects in decreasing the incidence and the effects of cardiovascular disease—and making this mineralized water available to the general public regardless of their geographical location.

DESCRIPTION OF THE PREFERRED EMBODIMENT

The mineralized water of this invention consists essentially of the following ingredients, ranges and proportions, viz an aqueous solution of:
20-40 mg/liter Strontium ions;
50-100 mg/liter Magnesium ions;
60-125 mg/liter Calcium ions; and
0.06-0.15 mg/liter Lithium ions.

The optimal formulation lies at or near the upper limits stated above.

The stated metallic ions are added to distilled water in the form of water soluble salts thereof, e.g., as the sulphates, nitrates, or chlorides. No sodium is added.

One presently preferred method of preparation of the mineralized water of this invention utilizes a distilled water base into which the predetermined concentration of e.g., strontium nitrate, magnesium sulphate, calcium chloride and lithium chloride are added.

The resulting mineralized water is then packed in suitable containers for later distribution and use.

It is also within the scope of this invention to prepare the potable mineralized water by simply adding a tablet, pellet or powder containing the water soluble salts of the metals to distilled water in a sufficient amount to produce the aforedescribed concentration limits of metallic ions in the water, i.e.,
20-40 mg/liter Strontium ions;
50-100 mg/liter Magnesium ions;
60-125 mg/liter Calcium ions; and
0.06-0.15 mg/liter Lithium ions.

The optimal formulation lies at or near the upper limits stated above.

The epidemiological evidence indicates that the optimum formulation of mineralized water for daily ingestion purposes, i.e., for use as a drinking water, should not only contain the metallic ions of the foregoing salts but should be devoid of sodium salts. A mineralized water based on this formulation does not appear in nature to the best of our knowledge yet appears to offer maximum protection against the development and effects of cardiovascular disease.

Various modifications of the inventions will be apparent to those skilled in the art. We intend, therefore, to be bound only by the claims which follow.

We claim:

1. A sodium and potassium free mineralized drinking water formulation which consists essentially of an aqueous solution of distilled water containing:
   20–40 mg/liter Strontium ions;
   50–100 mg/liter Magnesium ions;
   60–125 mg/liter Calcium ions; and
   0.06–0.15 mg/liter Lithium ions,
each of said ions being present in association with water-soluble salts.

2. A solid formulation which consists essentially of:
   20–40 parts, by weight, of strontium in a water-soluble salt thereof;
   50–100 parts, by weight, of magnesium in a water-soluble salt thereof;
   60–125 parts, by weight, of calcium in a water-soluble salt thereof; and
   0.06–0.15 parts, by weight, lithium in a water-soluble salt thereof.

3. The solid formulation of claim 2 in tabletted form.

4. The solid formulation of claim 2 in powder form.

5. The solid formulation of claim 2 in pellet or capsule form.

6. The solid formulation of claim 2, which when added to a predetermined volume of distilled water, produces an aqueous solution containing:
   20–40 mg/liter Strontium ions;
   50–100 mg/liter Magnesium ions;
   60–125 mg/liter Calcium ions; and
   0.06–0.15 mg/liter Lithium ions.

7. The method of making a potable water which comprises the step of:
   adding to distilled water, water-soluble salts consisting essentially of strontium, magnesium, calcium and lithium in an amount sufficient to produce a concentration range of between
   20–40 mg/liter Strontium ion;
   50–100 mg/liter Magnesium ion;
   60–125 mg/liter Calcium ion; and
   0.06–0.15 mg/liter Lithium ion
   in the said water.

8. The method of claim 7 wherein said water-soluble salts are added in tablet form.

9. The method of claim 7 wherein said water-soluble salts are added in powder form.

10. The method of claim 7 wherein said water-soluble salts are added in pellet form.

* * * * *